INVENTOR.
Albert H. Rerick + Glenn A. Kellogg
BY Brown, Jackson, Boettcher + Dienner
ATTORNEYS.

April 21, 1953 A. H. RERICK ET AL 2,635,682
TIRE, WHEEL, AND LOCKING RING ASSEMBLING MACHINE
Filed Aug. 30, 1951 4 Sheets-Sheet 2

INVENTOR.
Albert H. Rerick + Glenn A. Kellogg
BY
ATTORNEYS.

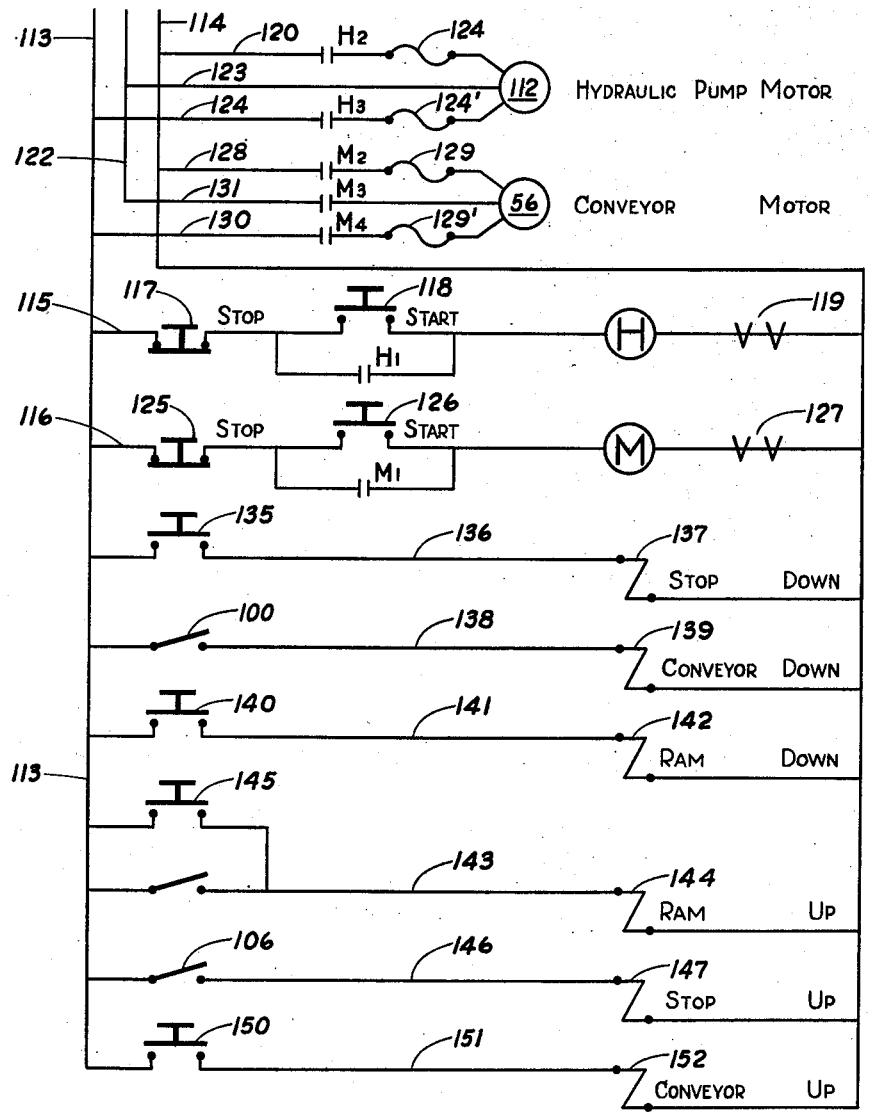

Patented Apr. 21, 1953

2,635,682

UNITED STATES PATENT OFFICE 2,635,682

TIRE, WHEEL, AND LOCKING RING ASSEMBLING MACHINE

Albert H. Rerick and Glenn A. Kellogg, South Bend, Ind., assignors to The Studebaker Corporation, South Bend, Ind., a corporation of Delaware Application August 30, 1951, Serial No. 244,334

4 Claims. (Cl. 157—1.2)

Our invention is directed to a new and improved machine for mechanically assembling a pneumatic tire and wheel with a locking ring.

More particularly our invention is concerned with a press mechanism for assembling mechanically an automotive vehicle's tire, wheel and locking ring wherein a new and improved means is utilized for conveying the heavy tire and wheel into the press, locating such for assembly with the locking ring and carrying the same away from the press after completing the assembly of the locking ring with the wheel and tire.

Briefly, our invention includes a substantially conventional vertical press mechanism fitted with a special fixture and head assembly which cooperate for pressing locking rings onto a wheel rim and utilizing a chain or articulate conveyor for moving a tire and wheel into position for assembly with a locking ring. Further, the articulate conveyor is utilized for carrying the assembled combination of the tire, wheel and locking ring away from the press. The press is also fitted with certain control switches and stops, suitably interconnected and electrically energized for semi-automatic assembly of the named items which enables one to complete the otherwise difficult assembly operation involved in a quick, efficient and accurate manner.

One of the main objects of our invention is to provide an assembling machine adapted for assembling pneumatic automotive tires, wheels and locking rings in a quick and convenient manner with a minimum of effort.

Another object of our invention is to provide an assembling machine having an improved conveyor table means whereby tires and wheels to be assembled may be moved mechanically from an incoming or feed conveyor, placed in a ready position for assembly with the locking ring and moved to an outgoing conveyor upon completion of the desired asssembly operation.

Another object of our invention is to provide a system of switches and stops for our press whereby convenient, electrically actuated, semi-automatic control of our tire and wheel assembling press may be accomplished for its operation to bring about the assembly and combination of a pneumatic automotive tire, wheel and locking ring.

The above and further objects and features of our invention will be recognized by those skilled in the art from the following descriptive details thereof and as amplified by the accompanying drawings of a preferred embodiment of our invention.

Figure 1:
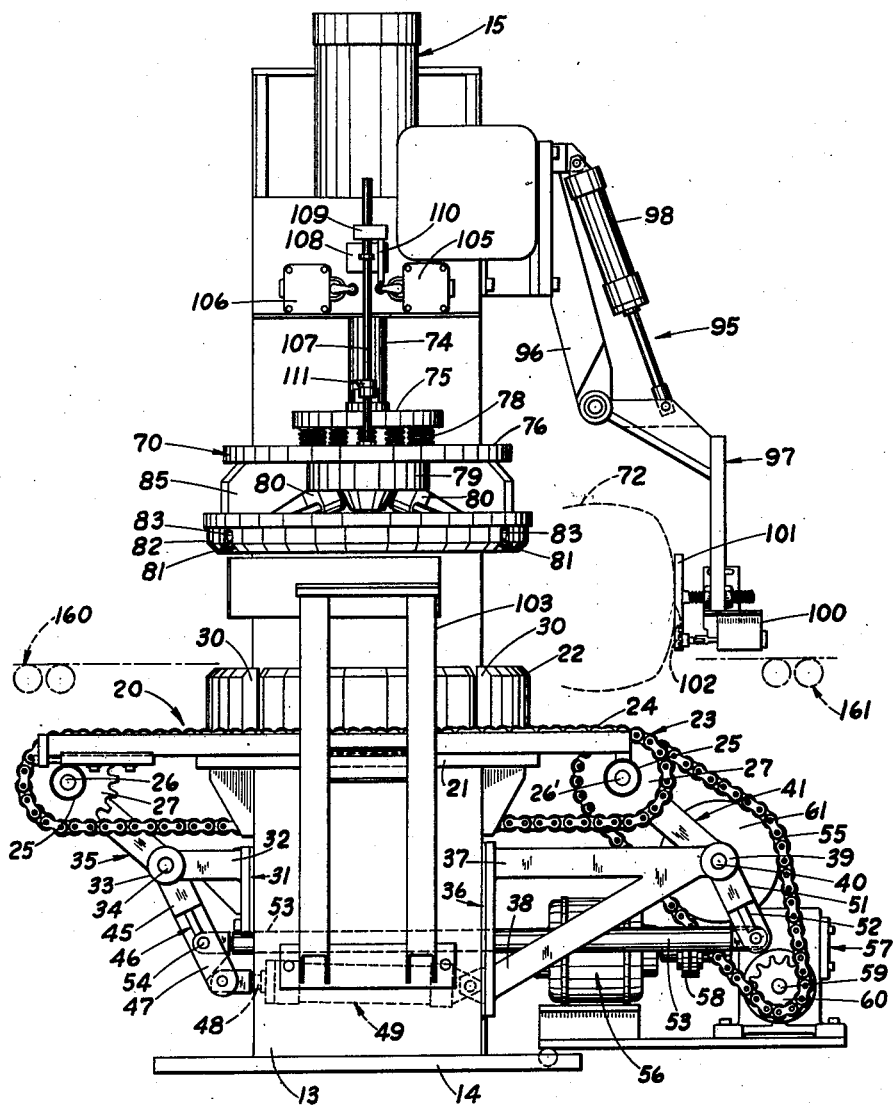
Figure 1 is a front elevational view of our tire and wheel assembling press showing the details of the conveyor table associated therewith and demonstrating its positioning of a tire to be assembled with a locking ring thereon.
Figure 3:
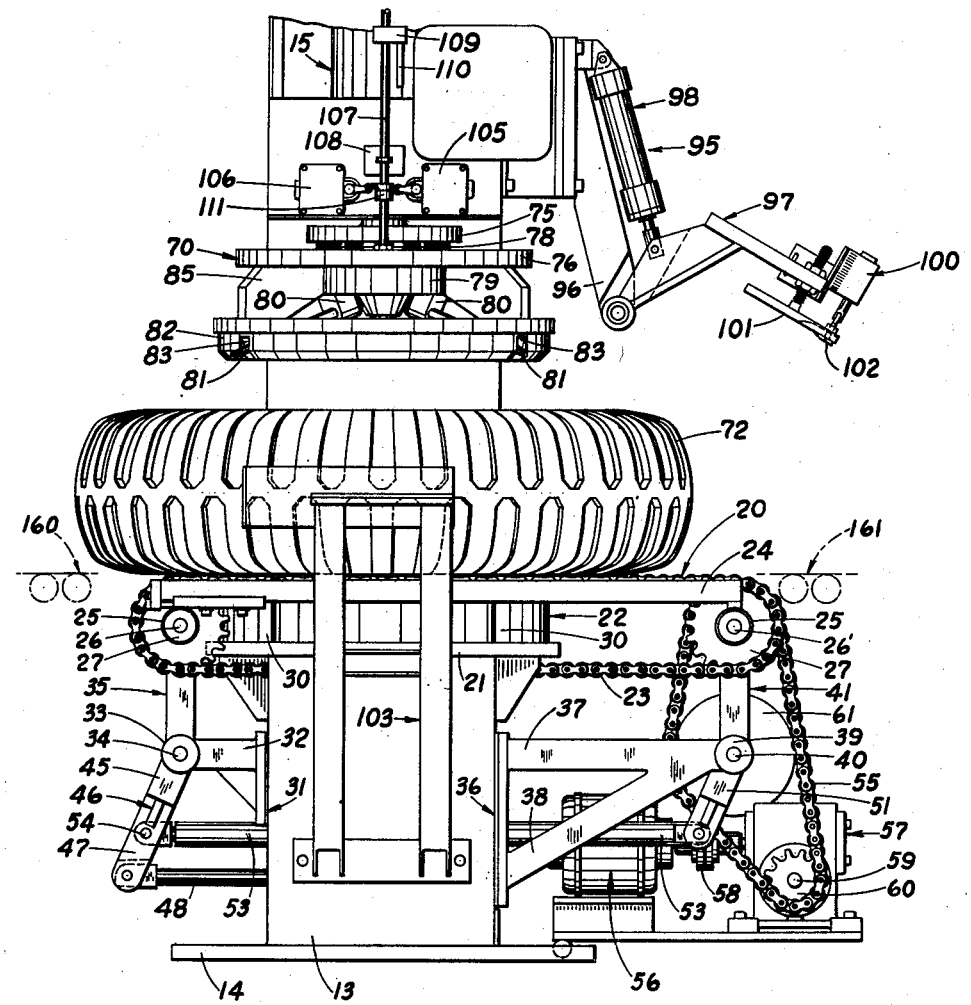

Figure 3 is a front elevational view, similar to Figure 1, illustrating the positioning of the press parts and the stop mechanism associated with our tire and wheel assembling machine when a tire and wheel assembly are in a condition to be conveyed away from the machine after assembly with a locking ring and also illustrating the utilization of the movable conveyor table for this purpose; and Figure 4 is a schematic wiring diagram illustrating the electrical connection and association of the various switches, automatic and manual, utilized for the semi-automatic and sequential control of our tire and wheel assembling machine.

Figure 2:
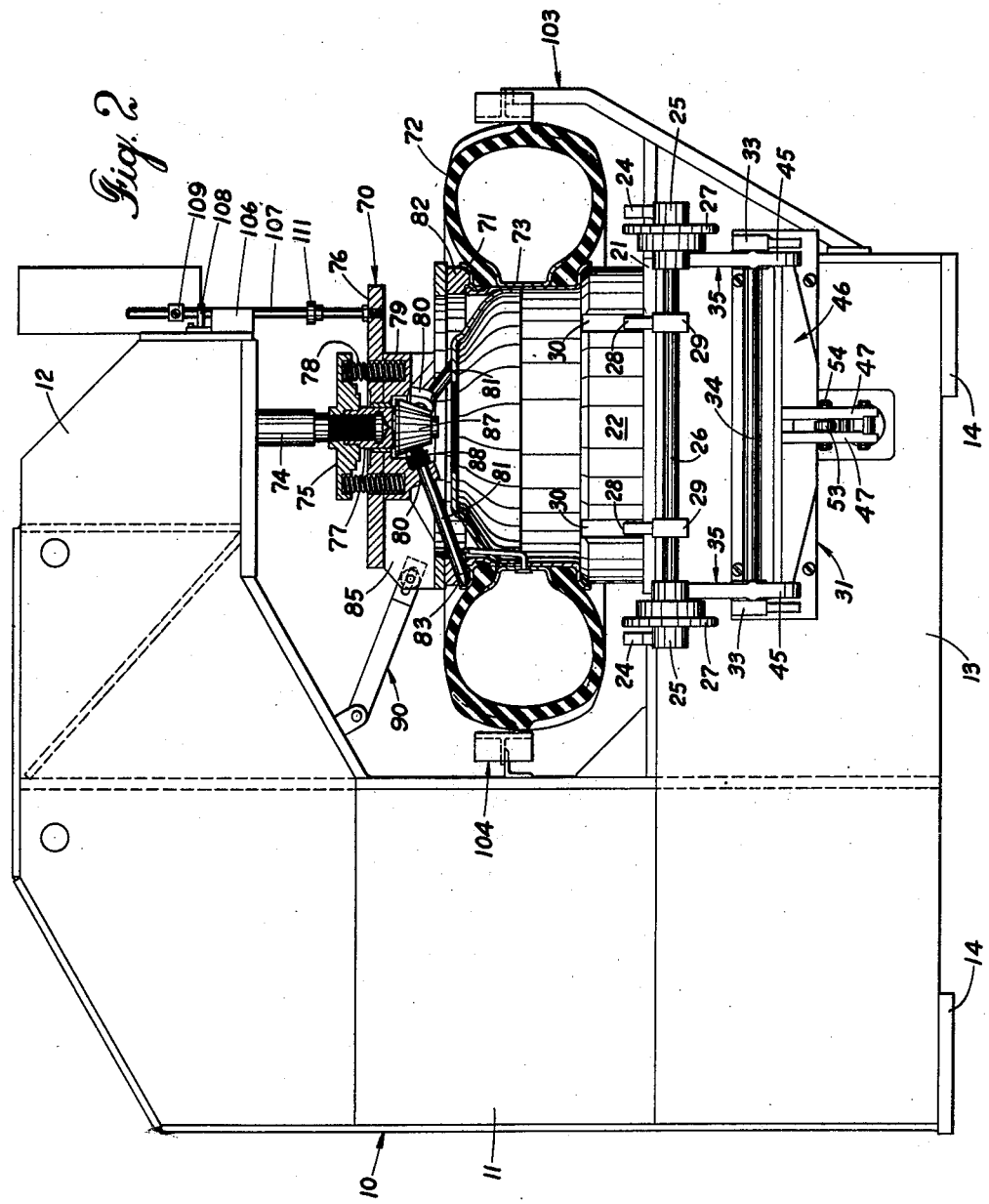
Figure 2 is an end elevational view of the machine illustrated in Figure 1, showing the details of the lower fixture and assembling head utilized with the press and the manner in which a tire, wheel and locking ring are combined thereby.

Turning now to the features of our tire and wheel assembling machine as illustrated in the drawings Figures 1 through 3.

With particular reference to Figure 2 of the drawings, it will be seen that a conventional press 10 is therein illustrated for supplying the pressure necessary in assembling a locking ring with a tire and wheel. The press 10 comprises essentially a C-shaped frame having a vertical upright stanchion portion 11, an overhanging upper head portion 12 and an underhanging lower head portion 13, the latter of which is adapted to support the work for which our device is designed to assemble. The press framing may be constructed, as illustrated, of prefabricated sections of suitable weight sheet steel, or the like, suitably welded together to make up the prefabricated C-shape as desired. Base plate members 14, 14 are positioned transversely of the frame to give lateral stability to the press frame and to provide a means for tieing the same to an underlying supporting bed or floor, all in a conventional manner. The head portion 12 of the press 10 is fitted with a suitable hydraulic ram and piston assembly 15, as illustrated in Figures 1 and 3, to support and actuate a vertically movable head portion of our tire assembling mechanism as will appear later herein. The press and its general operating features are conventional to any number of vertical upright presses commercially available, as will be recognized by one skilled in the art.

Supported on the lower head portion 13 of the press we have provided a movable conveyor table assembly, designated generally at 20, which constitutes our chief contribution over the prior art in this field and the features of which will now be set forth.

As seen from Figures 2 and 3 in particular, a horizontal bed plate 21 is fitted transversely across the lower head 13 of the press frame. A stationary lower fixture ring member 22 is mounted centrally atop of base plate member 21 and rigidly connected thereto in an immobile manner. A pair of articulate link chains 23, 23 are mounted to run in parallel spaced relation on opposite sides of the ring member 22 (one in front and one behind the ring as viewed in Figure 1) each chain 23 comprising a closed endless loop. Side supporting bars 24, 24, as seen in Figure 2, are mounted in parallel relation to each of the chains 23 and outwardly therefrom to extend transversely across the bed plate member 21; such bars constituting the upper links of a parallelogram style of linkage utilized for imbuing the chains 23 with a vertical arcuate movement as will be described presently. To each end of the bars 24 and depending therebeneath is rigidly fastened a bearing bracket 25, with the bracket members 25 on like ends of the two bars 24 rotatably supporting transversely extending shafts 26 and 26'. Sprocket wheels 27, 27 are secured to the outer opposite ends of the shafts 26 and 26' for rotation therewith and for supporting the chain members 23 thereabout. To provide further support for a tire to be placed on top of the movable table structure just described, additional bars 28, 28 reaching longitudinally of the bed member and positioned intermediate the ends of the shafts 26, 26' are provided. Opposite ends of the bars 28 are connected to the shafts 26, 26' by means of suitable lugs 29 which are positioned transversely to the ends of the bars 28 and loosely journal the shafts 26 and 26' therethrough to permit their rotational movement therein. As viewed in Figure 2, it will be recognized that the bars 28 are positioned in parallel spaced relation and that such extend through the lower ring member 22 via vertical slotted openings 30 formed for that purpose in opposite sides of the ring member 22. It will be recognized from the structure described so far that the chain members 23, the supporting sprockets 27 therefor, the shafts 26 and 26' and the various bars 24 and 28 are adapted for movement transversely of the stationary ring member 22 to provide a translatory actuation of the movable table structure 20.

In order to properly support shaft 26, we have provided a bracket member 31, bolted to the left side of the lower head 13 of the press as viewed in Figure 1. As seen in Figure 2, bracket member 31 is provided with transversely projecting arms 32 at the extreme ends of which are formed cylindrical shaft journaling bosses 33. A transversely extending shaft 34 is stationarily mounted between the boss members 33. Adjacent each end of the shaft member 34 a dog leg link member 35 is provided; such being pivotally mounted intermediate its ends on the shaft 34 for limited rotational movement thereabout. It will be recognized that while each of the links 35 is connected in the manner described to the shaft 34, its upper end is journaled about shaft 26 to provide bearing support during rotational movement of the latter shaft therein. The right hand shaft 26', as viewed in Figure 1, is similarly supported by an elongated bracket 36 rigidly connected to the opposite side of the base member 13 of the press, which, like bracket 31 is provided with a pair of spaced apart arms 37 supported by angularly disposed brace members 38. Arms 37 each have bearing portions 39 at the extreme ends thereof in which a secondary shaft 40, similar to shaft 34, is received and supported. A pair of dog leg members 41, of similar size and dimension to links 35, interconnect shaft 40 with the shaft 26'. Links 41, as with links 35 described heretofore, are pivotally mounted on shaft 40 intermediate their ends for pivotal movement thereabout and are loosely journaled at their upper ends about the shaft 26'.

Further, it will be recognized that link members 41 and 35 are mounted in parallel relation and that the arms 32 and 37 of the brackets 31 and 36 respectively are likewise mounted in parallel relation to the various bars 24 and 28 to make up a parallelogram linkage. To provide a means for actuating the parallelogram linkage described above, lower arms 45 extend angularly outward from the pivotal junction of the links 35 with the shaft 34. As seen in Figure 2 of the drawings, a yoke member 46 extends transversely between arms 45 and is rigidly connected therewith. The yoke 46 is further provided with a pair of central arms 47, 47, to the lower end of which is pivotally joined a piston rod 48 of a hydraulic actuating ram 49 as shown in dotted lines of Figure 1. The ram 49, of course, provides the necessary rocking motion of the yoke and links 35 about the pivotal shaft 34 to actuate the movable table assembly 20 in a manner to be related hereinafter. As with links 35, the links 41 associated with the right hand side of the conveyor table, as seen in Figure 1, are provided with lower angularly extending arms 51 between which is rigidly arranged a second yoke member 52 pivotally joined midway between its extremities to a cross connecting transfer rod 53. The opposite end of the transfer rod 53 is pivotally connected to the yoke member 46 as by pivot pin 54. It will thus be recognized that upon movement of the piston rod 48 of the ram 49 to the left, as seen in Figure 1, the parallelogram linkage attached thereto comprising the various links 35, bars 24 and 28, links 41, and transfer rod 53 will cause the conveyor chains 23 and the supporting structure therefor to move in a clockwise arcuate direction upwardly as viewed in that figure to reach their Figure 3 position. Conversely, retraction of the hydraulic ram rod 48 will cause the conveyor chains 23 and the supporting linkage structure to move in an arcuate path downwardly or counterclockwise, as viewed in Figure 1 of the drawings, to assume their Figure 1 position.

In order to provide means for rotatably driving the shafts 26 and 26' for the purpose of moving the link chains 23 about the supporting sprockets 27, a second link drive chain 55 is provided. As will be recognized from Figures 1 and 3 of the drawings in particular, the shaft 26' at the right hand side of the press is provided with a double or a pair of sprocket wheels adjacent one end; one of said sprocket wheels being a sprocket wheel 27 about which one of the chains 23 is carried. The drive chain 55 engages the second sprocket wheel (not shown) on shaft 26' for rotatably driving that shaft. Means for supplying a power drive to the drive chain 55 comprises a conventional motor 56 coupled to a conventional gear reducer 57 through a coupling 58. An output shaft 59 of the reduction gear system 57 is provided with a driving sprocket 60 over which the drive chain 55 is trained. Intermediate the drive sprocket and the secondary sprocket (not shown on shaft 26') an idler wheel 61 is mounted on pivot shaft 40 for tensioning the drive chain and training such to clear the pivot shaft 40 as the conveyor table 20 is moved in its arcuate path. The chains 23 are constantly driven at like speeds so long as motor 57 is running.

As will be seen in Figures 1 through 3 of the drawings, we have provided an upper working head assembly, indicated generally at 70, for contacting and expanding radially outward a locking ring 71, to be locked with a conventional pneumatic tire 72 and a supporting wheel rim 73. The head 70 is, of course, connected to the lower end of a piston rod 74 associated in a conventional manner with the hydraulic, mechanical or pneumatic ram 15 associated with the press. From Figure 2 in particular, it will be recognized that the lower end of the piston rod 74 is fitted with an upper ring plate 75 which is threadingly received in coaxial relation thereabout. Immediately below the ring plate 75 a lower circular head plate 76 is provided concentrically outwardly of a connecting cap member 77 which embraces the lower end of the ram rod 74 beneath ring plate 75. Plate 76 is separated and held in resilient relation for vertical movement relative to the ring plate 75 by a plurality of compressive springs 78 which are suitably received in pockets formed in adjacent faces of the plates 75 and 76. Immediately below plate 76 a secondary lower head plate 79 is provided; such being rigidly connected to the head plate 76 by bolts or the like. Three ear members 80 are formed integrally with the secondary plate 79 and each receives angularly therethrough a cylindrical finger rod member 81 so that such rods project angularly downward, and radially outward of the ears 80, such being adapted for sliding movement therein. Below the ears 80 a larger diameter upper contacting head ring 82 is provided, and bears a diameter commensurate with the diameter of the supporting wheel rim 73 associated with the tire assembly. Ring 82 is invaded by the finger rods 81 and is provided with suitable passageways 83 therethrough for the sliding reception of the finger rods 81, as particularly shown in Figures 2 and 3 of the drawings. The upper head contacting ring 82 is rigidly tied to the ring plate 76 by means of intervening web members 85 which are suitably welded or otherwise rigidly fastened in between the two plates to keep the same in a desired parallel spaced relation and concentrically related in coaxial disposition with the piston rod 74 of the hydraulic ram 15. Located immediately below the cap member 77 is a truncated conical member 87 which contacts the inner ends of the finger rods 81; such being loosely received intermediate the three finger members and housed in a cavity within plate member 79 for vertical movement in response to depressing actuation of the hydraulic ram rod 74 of the press. To insure a steady contact of the adjacent ends of the finger rods 81 with the face of the conical actuating member 87, compressive springs 88 surround the ends of the finger rods radially inward of the ear members 80; such being connectively attached to the ends of the finger rods and adapted to keep the finger rods in constant engagement with the surface of the conical actuating member 87. To insure against rotational movement of the head assembly relative to the hydraulic ram piston rod 74 a linkage 90 is connected between one of the ribs 85 and the framing of the press 10.

To guarantee accurate positioning of the tire and wheel assembly relative to the actuating head assembly 70 of our tire assembling machine, we have provided a limit stop 95 on the right hand side of the press head 12, as viewed in Figure 3 of the drawings. From that figure it will be seen that the stop 95 comprises an angular supporting arm 96, to the lower end of which is pivotally connected a dog leg link 97 which is adapted for arcuate movement relative to arm 96 by means of an actuating hydraulic or pneumatic piston and cylinder arrangement 98, one end of which is pivotally tied to the head of the press and the other end of which is pivotally tied to the link 97 intermediate its ends. The lower end of the link 97 supports a limit switch 100 of a plunger variety and a stop plate 101 mounted rigidly to the lower end of the dog leg link 97. The stop plate 101 is provided with an opening near one edge through which a plunger 102 of the switch 100 projects for actuation upon contact with the tire 72 as will be described later herein.

Further, guiding of the tire assembly when such is being positioned under the actuating head 70 of our tire assembling machine is provided by means of a forward guide rail means 103 which is mounted on the front end of the machine forwardly and above the bed plate 21. A similar guide rail 104 is mounted on the vertical portion 11 of the press frame to act as a limiting guide means in positioning for the rearward side of the tire assembly.

A pair of switches 105 and 106 are mounted on the head of the press, one on each side of a sliding rod member 107 which is carried by plate member 76 of the head assembly and guided by bracket 108 fastened to the head of the press. A lug 109, carrying a finger 110 is mounted near the upper end of the rod member 107 and a second lug 111 is mounted adjacent the lower end of rod 107. It will be recognized that the finger 110 is adapted to contact and actuate switch 105 upon depression of the head assembly while lug 111 is adapted to contact and actuate switch 106 upon raising of the head assembly; the lug bypassing switch 105 in its contacting of switch 106.

Having thus set forth the various elements and their associated combined relation in the tire and wheel assembling machine of our invention, reference is made to Figure 4 of the drawings wherein a schematic wiring diagram of the various control switches and circuits is displayed.

As will be recognized from Figure 4, a hydraulic pump motor 112 and the conveyor motor 56 are connected in circuit with a source of 440 volt, 60 cycle, A. C. electrical energy. It will be recognized that two power lines 113 and 114 are bridged by a starting circuit 115 for the hydraulic pump motor and a starting circuit 116 for the conveyor motor 56. The starting circuit 115 includes a plunger variety stop switch 117, which is normally closed in circuit; a normally open manual starting switch 118, a relay designated H, an overload protector 119 and a contact H-1 in a holding circuit connected in parallel relation to the starting switch 118. Direct connection of the hydraulic pump motor 112 with the power lines 113 and 114 is made by leads 120 and 121 with lead 120 connecting to the power line 114 and lead 121 connecting to the power line 113. A third ground or neutral power conductor 122 is connected directly to motor 112 via conductor 123. The circuit from conductor 114 to motor 112 via conductor 120 includes a relay contact H-2 and an overload fuse 124. Circuit from power conductor 113 to motor 112 includes conductor 121, a relay contact H-3 and an overload fuse 124'. It will be recognized that upon depression of the normally open starting switch 118 relay H is energized closing the holding circuit including the contact H-1 and in sequence the contacts H-2 and H-3 to the motor. Upon manual release of the starting switch 118, so that such may assume its normally open position, the holding circuit from the relay H through the contacts H-1, H-2 and H-3 maintains the circuit to motor 112 in a closed condition for the energization of the latter. Breaking of the circuit in the stopping of motor 112 is accomplished by the depression of the normally closed switch 117.

Circuit 116 to the conveyor motor 56 includes a normally closed stop switch 125, a normally open start switch 126, a relay designated M, an overload protector 127 and a parallel holding circuit containing contact M-1 for bypassing the start switch 126. Connection of motor 56 to the power lead 114 is accomplished through conductor 128 which is in circuit with a relay contact M-2 and an overload protective fuse 129. Likewise, a conductor 130 connects motor 56 to the power conductor 113 and a third conductor 131 connects the motor to the neutral conductor 122 of the incoming power conductors. Conductor 130 includes in circuit relay contacts M-4 and fuse protector 129'. Conductor 131 is likewise in circuit with relay contacts M-3. As with the starting of the hydraulic motor 110, depression of the start switch 126 associated with the conveyor motor 56 causes an excitation of relay M to provide the closing of the contacts M-1 in the holding circuit and the subsequent closing of relay contacts M-2, M-3 and M-4 to energize the motor 56. Release of the normally opened start switch 126 in the conveyor motor circuit may then be made with the energization of the motor 56 being carried on through the bypassing holding circuit including the contacts M-1. As with stop switch 117 of the hydraulic pump motor circuit, the normally closed stop switch 125 in the conveyor motor circuit serves to interrupt the energization of motor 56 upon manual depression.

Also associated in parallel circuit across the power conductors 113 and 114 are a plurality of control switches for the sequential control and actuation of the various elements of our tire and wheel assembly machine. A stop down switch 135 is connected by conductor 136 in circuit with a solenoid 137 and the power conductors 113 and 114. Depression of the normally open, manually actuated switch 135 serves to energize solenoid 137 for actuating a valve (not shown) controlling the flow of oil, which is pressurized by the hydraulic pump motor 112, to the hydraulic piston and cylinder 98 controlling the arcuate actuation of the stop member 95; thus providing a manual control for placing the stop plate 101 in its down or Figure 1 position wherein such is adapted to regulate the positioning of the tire relative to the head assembly 70 of the hydraulic press.

Switch 100, which is mounted at the end of the stop arm 97, is connected in circuit with the conductor leads 113 and 114 by means of a conductor 138 and is in circuit with a second solenoid 139. Solenoid 139 controls a valve (not shown) regulating the flow of pressurized fluid to the actuating piston and cylinder 49 which serves to control the arcuate movement of the movable conveyor table 20 for retracting the same arcuately downward to its Figure 1 position; this downward actuation of the conveyor 20 taking place automatically upon the positioning of the tire in its appropriate condition relative to the actuating head 70 wherein switch 100 is closed by contact with the tire 72.

A ram down switch 140 is also connected across the power conductors 113 and 114 by means of a conductor 141 which connects the switch 140 in circuit with a ram solenoid 142. Ram solenoid 142 controls the valving of the hydraulic fluid to the actuating ram 15 of the press for moving the same downwardly to depress the head assembly 70 of our tire and wheel assembling apparatus. It will be recognized that the ram down switch 140 is of a manual variety providing manual control of the downwardly actuation of the press ram. Depression of the ram to its full down position, as controlled by switch 140, causes finger 110, which is movable with the upper head plate 76, to contact and close switch 105 which is connected across power leads 113 and 114 by conductor 143 and is in circuit with a solenoid 144 which serves to direct the valving of the pressurized hydraulic fluid to actuate the press ram 15 upwardly. It will be recognized that switch 105 is actuated automatically upon the depression of the head assembly 70 to its fully down position wherein the locking ring 71 is locked with the tire wheel 73. Means for manually controlling the upward movement of the press ram 15, if desired, is provided through switch 145 which is a normally open manual variety and connected in parallel circuit with switch 105.

Switch 106 which is contacted and closed by lug 111, upon the upward movement of the press ram, is connected across the power leads 113 and 114 by means of a conductor 146 and is associated in circuit with a solenoid 147. The actuation of switch 106 is automatic and the energization of solenoid 147 serves to control the flow of hydraulic fluid to the piston and ram assembly 98 controlling the stop member 95 for moving the same upwardly to its Figure 3 position. A manually actuated conveyor up switch 150 is also provided in circuit with power conductors 113 and 114 by means of a connecting conductor 151 and is in circuit with a solenoid 152; the latter of which controls the flow of hydraulic fluid to the ram and piston assembly 49 for moving the conveyor table 20 arcuately upward to its Figure 3 position after completion of the assembly of the tire wheel and locking ring.

Use and operation

In utilizing our tire and wheel assembling machine as described, a tire, such as 72, which is to be fitted with a locking ring 71, is first assembled with the wheel rim 73 and placed on an incoming conveyor of the roller variety as demonstrated at 160 in Figures 1 and 3 of the drawings. In the assembly line production and combining of the tire locking ring with such tire and wheel rim assemblies, a plurality of such tire and wheel rims are constantly moved along the conveyor 160 to the operator stationed at our machine. Upon approaching the rim assembling station in the assembly line the operator manually moves the tire 72, assembled with its wheel rim 73, onto the conveyor table 20 which runs constantly from left to right as viewed in Figures 1 and 3 and which is positioned, at this stage, in its upward position so that it lies at a level with the bed of the roller conveyor 160. Since the chains 23 are constantly driven throughout the operation of our tire wheel assembling machine, the tire is carried by the two parallel spaced chains 23 between the lateral guide supports 103 and 104 to register against the stop member 95 which is lowered to its Figure 1 position in response to energization of the switch 135 and its associated circuit. As the tire comes into registering alignment beneath the movable head assembly 70 of our machine, switch 100, associated with the stop 95 is depressed automatically to cause the lowering of the conveyor table 20. Lowering of the conveyor 20 serves to align the tire wheel 73 on the upper chamfered edge of the fixture ring 22 centrally and coaxially beneath the movable head assembly 70 of our machine. Having thus positioned the wheel and tire in condition for assembly with the locking ring, the operator then depresses the manually controlled switch 140 which serves to hydraulically actuate the ram assembly 15 of the press downwardly to move the head assembly 70 into contact with a locking ring 71 which has been previously placed in position for assembly with wheel rim 73 by the operator. Downward actuation of the head assembly, of course, serves to permit engagement of the locking ring 71 by the several rod members 81 which, under the impetus of the vertical downward force of the head assembly and the actuation of the conical surface of the actuator 87, move radially outwardly to expand ring 71 and cause same to clear the beaded rim edge of the tire wheel 73. With the locking ring thus expanded radially outward into a position where its release will permit snapping engagement thereof with the tire wheel, the operator then depresses the manually actuated switch 145 if necessary, or the automatically actuated switch 105 responds on contact with finger 110, causing the retraction of the head assembly upwardly. The removal of the head assembly from the locking ring 71 permits its locking engagement with the rim of the tire wheel as desired. Upon upward vertical movement of the head assembly, lug 111 contacts switch 106 to automatically actuate the stop member 95 for retracting the same upwardly to its Figure 3 position wherein the tire supporting rim and locking ring as assembled may be moved to an outgoing roller conveyor 161. To disengage the wheel and tire assembly from the fixture ring 22, the operator depresses the manually actuated switch 150 which serves to move the conveyor bed 20 arcuately upwardly to its Figure 3 position wherein the moving chains 23 carry the assembled tire, wheel and locking ring onto the roller conveyor 161. The operator then assembles another tire and wheel with a locking ring beneath the head of our assembling machine for locking the ring with the tire wheel by repeating the above operational steps. While it is realized that several modifications and changes as to sequence and style of automatic actuation of the several movements necessary for the assembly of the tire, wheel and locking ring as described above may be made, the above sequence and mode of operation is preferred.

Thus it may be recognized that we have provided a new and improved tire and wheel assembling machine of the character used for locking either closed or open style locking rings with a tire and wheel and in which is utilized a new and improved movable conveyor table adapted to carry the heavy tire and wheel assemblies into and away from a position for assembly with the locking ring, the latter of which is expanded and snapped in place with the rim of the tire wheel under the influence of a hydraulically or elsewise actuated vertical press ram provided with a movable head which acts against a fixture designed to support the tire and wheel assembly.

While various changes, modifications and substitutions of equivalents may be made in our above described perferred embodiment of our invention, we do not wish to be limited to the specific features of the illustrated mechanism other than as may appear in the following appended claims.

We claim:

1. A tire and wheel assembling machine of the class described, comprising, a vertical ground engaging frame, a vertically movable ram supported adjacent the upper end of said frame, a fixture ring supported fixedly and in coaxial relation below said ram for supporting an unassembled tire, wheel and locking ring in concentric and coaxial relation below said ram, a head assembly movable with said ram and mounted at the lower end of the latter for contacting and expanding said locking ring radially and concentrically outwardly for locking engagement with one edge of said wheel, a pair of motor driven, endless, articulate chains supported in parallel spaced relation on opposite sides of said fixture ring by means of a pivotal parallelogram linkage system and adapted to carry said wheel and tire onto and away from said fixture ring, and an actuating means connected to said parallelogram linkage and said frame for pivotally moving said linkage to simultaneously move said two chains in parallel arcuate paths toward and away from said fixture ring and vertically above and below the upper edge thereof to provide means for moving said tire and wheel to be assembled with said locking ring horizontally toward and away from said fixture ring as desired.

2. In a tire and wheel assembling machine for pressing a locking ring onto one rim edge of a tire supporting wheel by expanding said ring radially outward and pressing the same over said rim as said wheel is supported in a horizontal position on an upper edge of an immobile fixture ring, a conveyor table structure for moving said tire and wheel to be assembled with said locking ring onto and off of said fixture ring, comprising in combination, a pair of articulate, endless, conveyor chains positioned in vertical spaced planes disposed in horizontal parallel spaced relation on opposite sides of said fixture ring, a pair of coplanar, rotatable shafts disposed transversely of said chains and in parallel spaced relation on opposite sides of said fixture ring, each shaft carrying sprocket wheels for driving connection with each of said chains; an arcuately movable parallelogram linkage system interconnecting and supporting said two shafts whereby such are movable therewith in fixed parallel spaced relation and in arcuate paths about coplanar and parallel spaced horizontal axes, drive means for simultaneously driving said two chains and shafts at like speeds and in the same direction, and means for actuating said linkage system to carry simultaneously said chains in a vertical arcuate path from a position below the upper edge of said fixture ring to a position above the upper edge thereof and vice versa whereby said table conveyor is adapted sequentially to move said tire and wheel across the upper end of said fixture ring, deposit the same on the upper end thereof, as it is retracted out of engagement with said tire, and be raised again to carry said wheel and tire away from said fixture ring after assembly thereof with said locking ring.

3. In a tire and wheel assembling machine for pressing an annular locking ring over one rim edge of a tire supporting wheel, a supporting frame having separated upper and lower head sections, a hydraulically actuated ram means mounted on said upper head section for vertical movement toward and away from said lower head section, an annular wheel supporting fixture ring mounted fixedly to said lower head section in coaxial spaced relation with respect to said ram means, a head assembly mounted at the lower end of said ram means, movable toward and away from said fixture ring with said ram means and adapted to contact, expand radially outward and press an annular locking ring onto a second rim edge of said wheel, and a conveyor table structure mounted horizontally below said fixture ring, comprising, a parallelogram linkage structure and a pair of motor driven, articulate, endless conveyor chains disposed in parallel spaced relation on opposite sides of said fixture ring and supported by said parallelogram linkage structure; said chains being constantly and simultaneously driven in the same direction and movable actuately into positions above and below an upper edge of said fixture ring to engage and disengage with said tire, and a hydraulically actuated cylinder and piston means for moving said parallelogram linkage and chain to said positions; a pair of stop members mounted in fixed spaced relation radially outward and on opposite sides of said fixture ring, and a movable stop means mounted radially outward of a third side of said fixture ring and movable into and out of a fixed stop position relative thereto whereby a tire, wheel and locking ring to be assembled by said machine may be carried over said fixture ring by said chains when said conveyor table is in its said upper position, aligned coaxially with said fixture ring by said stop means, lowered concentrically onto said fixture ring by movement of said conveyor table to its said lower position, assembled under vertical pressing action of said ram means and carried away from said fixture ring by said chains upon movement of said conveyor table to its said upper position.

4. In a vertical press machine for assembling a wheel rim, tire and locking ring, the combination comprising, a supporting ground engaging frame of a substantially C-shaped configuration, hydraulic ram means mounted for vertical movement on an upper head end of said frame, an annular fixture ring mounted coaxially and concentrically below the lower end of said ram means in a fixed immobile position on a lower head end of said frame, a pair of motor driven, endless, articulate chains positioned in parallel spaced relation on opposite sides of said fixture ring, a parallellogram linkage system supporting said chains, hydraulic piston and cylinder means connected between said linkage system and said frame for imparting to said linkage system an arcuate movement in a vertical plane, said linkage system moving said two chains between an upper horizontal plane, located above an upper edge of said fixture ring, and a lower horizontal plane, located adjacent a lower edge of said fixture ring; stop means spaced outwardly on three sides of said fixture ring for locating an assembled tire and wheel, to be fitted with said locking ring, concentrically and coaxially over said upper edge of said fixture ring, one of said stops being selectively movable away from said ring to permit the continued passage of said tire and wheel away from said machine, an upper head assembly mounted on said ram means for movement therewith toward and away from said fixture ring and housing a plurality of rod members which are simultaneously movable radially outward thereof upon contact of said head assembly with said locking ring positioned concentrically therebelow on said tire and wheel to be assembled, said rods contacting and expanding said locking ring to engage the same over one rim edge of said wheel upon the lowering of said head assembly and ram means in proximity to said fixture ring, and an electrical control system for controlling the sequential operational movements of said hydraulic ram, said one stop means and the arcuate travel of said two chains and the supporting parallelogram linkage therefor.

ALBERT H. RERICK.
GLENN A. KELLOGG.

References Cited in the file of this patent

UNITED STATES PATENTS

| Number | Name | Date |
|---|---|---|
| 1,721,895 | Batie | July 23, 1929 |
| 1,850,053 | Stevens | Mar. 15, 1932 |
| 2,488,376 | Clauser | Nov. 15, 1949 |